United States Patent [19]

Kurata et al.

[11] Patent Number: 4,518,999
[45] Date of Patent: May 21, 1985

[54] PICTURE IMAGE POSITION SETTING APPARATUS

[75] Inventors: Masami Kurata; Hiroyuki Saitoh; Masakane Matsuda, all of Kanagawa, Japan

[73] Assignee: Fuji Xerox Co., Ltd., Tokyo, Japan

[21] Appl. No.: 472,824

[22] Filed: Mar. 7, 1983

[30] Foreign Application Priority Data

Mar. 11, 1982 [JP] Japan .................................. 57-37289

[51] Int. Cl.³ .......................................... H04N 1/04
[52] U.S. Cl. ...................................... 358/285; 358/293
[58] Field of Search ............... 358/256, 257, 264, 268, 358/285, 293, 294; 382/45, 61; 355/7; 235/495

[56] References Cited

U.S. PATENT DOCUMENTS 4,268,164 5/1981 Yajima et al. .......................... 355/7
4,371,898 2/1983 Nakamura ............................. 355/7
4,417,805 11/1983 Kishi ...................................... 355/7

Primary Examiner—John C. Martin
Assistant Examiner—Edward L. Coles
Attorney, Agent, or Firm—Sughrue, Mion, Zinn, Macpeak & Seas

[57] ABSTRACT

A picture image position setting apparatus having a linear reading element for obtaining picture information by scanning an original document successively line after line. A position designating cursor is attached slidably in a main scanning direction on a platen at a front end or a rear end portion of an original document scanning region on the platen. The position designating cursor is arranged to be sensed by the linear reading element to distinguish it from other scanned portions. A circuit converts picture image information with respect to the position designating which has been read into positional information in the main scanning direction.

9 Claims, 6 Drawing Figures

PICTURE IMAGE POSITION SETTING APPARATUS

BACKGROUND OF THE INVENTION

The present invention relates to a picture image position setting apparatus useful in partial copying, in picture transmitting or in electronic editing. When electronically editing, such as for example transmitting or copying an original document with an unnecessary region thereof cut off or, transferring or copying a specific region of an original document to another region, a picture image position setting apparatus is used for causing the system to recognize the above-mentioned regions. A picture image position setting apparatus is known of the type in which the coordinate of the above-mentioned region of the original document is inputted by using number keys. In such an apparatus, however, there is a problem in that not only the number keys and a data processing device annexed to the keys are required but also, the operator is apt to make mistakes during the inputting operation.

FIG. 1 shows a conventional picture image position setting apparatus in which a desired region of an original document can be directly designated on a platen. The moving direction of a linear reading element 1 such as a linear image sensor on a platen 2 (subscanning direction) is represented by X and the direction perpendicular to the direction X is represented by Y (main scanning direction). The picture image position setting apparatus is provided with cursors 3, 4, 5, and 6 positioned close to and outside the platen 1 for performing positioning operations in the X and Y directions. The cursors 3 and 4 disposed movably in the X-direction are respectively registered with the starting and end points in the X-direction in a designated region 7 which is indicated by oblique lines on the original document in the drawing. The other two cursors 5 and 6 disposed movably in the Y-direction are respectively registered with the starting and end points in the Y-direction in the designated region 7.

When the X-direction cursors 3 and 4 are moved for the operation of designating the boundaries of the region not-shown detector elements such as micro switches or reed switches move following the cursors 3 and 4 to be properly positioned at the starting and end points. In the reading operation, these detector elements serve to detect the time when the reading element 1 passes by the starting and end points in the X-direction on the region 7 to provide these starting and end points as inputs to the system.

When the Y-direction cursors 5 and 6 are moved for the region designating operation, on the other hand, two brushes 9A and 9B of a slide resistor 9 shown in FIG. 2 move following the cursors 5 and 6 to be respectively positioned at points corresponding to the starting and end positions in the Y-direction defining boundaries for the region 7. The voltages corresponding to the positions obtained as a result are amplified by amplifiers 11 and 12 and then converted into digital values by A/D converters 13 and 14. These ditgal values are inputted into the system as positional information with respect to the starting and end positions in the Y-direction.

In such a conventional picture image position setting apparatus, since the slide resistor 9 is used, a problem is poor accuracy in positioning in the Y-direction (main scanning direction) because of scatter of the characteristic of the slide resistor and/or an abrupt change in the local resistance value thereof. There has been also a drawback that an A/D converter is required for converting the output voltage of the variable resistor 9 into a digital value, resulting in increase in cost of the apparatus.

SUMMARY OF INVENTION

The present invention overcomes such deficiencies in the prior art and an object thereof is to provide in an electronic apparatus provided with a linear reading element in a picture image position setting apparatus in which the positioning operation in the main scanning direction can be economically achieved with high accuracy.

In order to attain the above-mentioned object of this invention, a picture image position setting apparatus according to the present invention comprises a linear reading element for reading picture information by scanning an original document line by line and a position designating cursor attached slidably in the main scanning direction onto a platen at a front end or a rear end portion of a scanning region of an original document on the platen. The position designating cursor is read by the linear read element to distinguish it from other portions. A circuit is provided for converting picture image information with respect to the position designating cursor which has been read into positional information in the main scanning direction.

The present invention will be described with respect to preferred embodiment thereof hereunder.

DESCRIPTION OF THE PREFERRED EMBODIMENT

Figure 1:
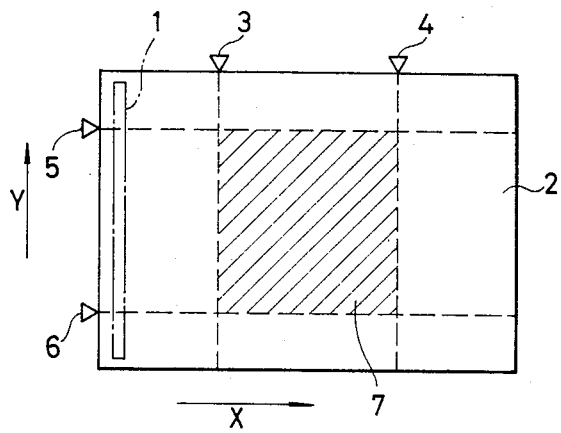
FIG. 1 is a plan view of a sheet of original document illustrating a method of designating a desired region of the document.
Figure 2:
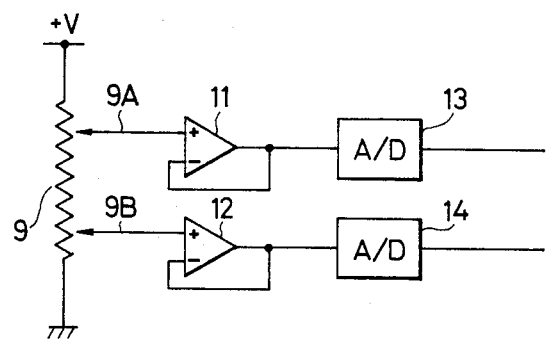
FIG. 2 is a circuit diagram illustrating the configuration of a prior art picture image position setting apparatus for designating position in the main scanning direction.
Figure 3:
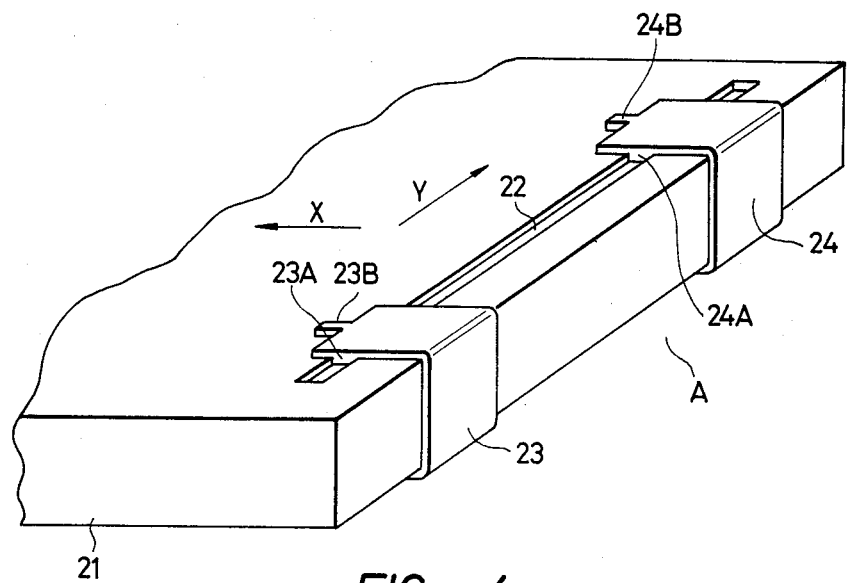
FIG. 3 is a perspective view of a position designation actuating section of the picture image position setting apparatus in accordance with this invention.

FIG. 3 illustrates a position actuating section of a picture image position setting apparatus in accordance with this invention. The position designation actuating section A is provided at a front end portion of a transparent platen 21. The platen 21 is formed with an elongated groove 22 extending in the Y-direction (main scanning direction) in the upper surface and at the front end portion thereof. At this end portion of the platen 21, a pair of position designating cursors 23 and 24 each having a U-shaped cross-section are attached to the platen 21 such that they sandwich the upper and lower surfaces of the platen 21 therebetween. The pair of position designating cursors 23 and 24 are respectively provided with a pair of protrusions 23A and 24A at portions corresponding to the groove 22 so that the cursors 23 and 24 can be slidably moved in the Y-direction without detecting from the platen 21 while loosely fitting the protrusions 23A and 24A within the groove 22. Indicating tips 23B and 24B each projecting in the X-direction are provided at the respective end portions of the position designating cursors 23 and 24. These position designating cursors 23 and 24 are made of a white plastic material.

Figure 4:
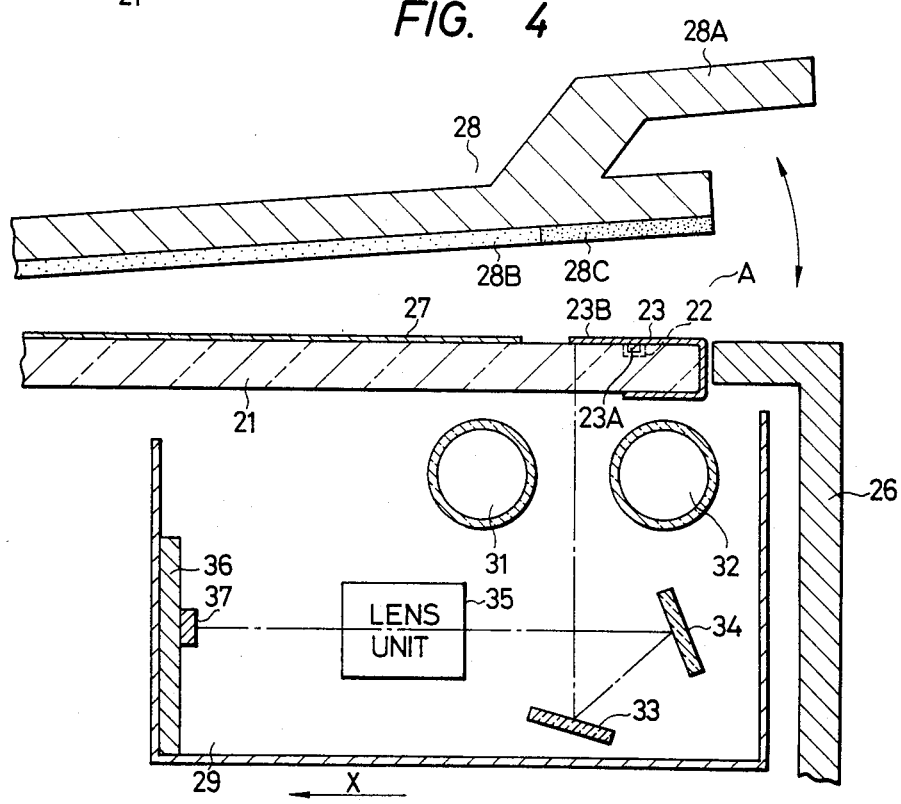
FIG. 4 is a cross-sectional view of a portion of a copying machine provided with the position designation actuating section.

FIG. 4 illustrates a part of the reading scanning section of a copy machine provided with the position designation actuating section. The platen 21 is horizontally fixed above a copy machine 26 so that an original document 27 may be placed on the upper surface of the platen 21. A platen cover 28 is provided above the platen 21 opened and closed in the directions indicated by an arrow in FIG. 4. When a handle 28A is grasped and pushed down, platen fixing plates 28B and 28C, which are made by affixing plastic sheets on the surface of an urethane material, abut on the original document 27 and the position designating cursors 23 and 24 to fix their positions. The plastic sheet of the platen fixing plate 28B is white while the platen fixing plate 28C is black.

A reading unit 29, is guided by a rail (not shown) to reciprocate to read a picture image. It is disposed under the platen 21. The reading unit 29 is provided with a pair of fluorescent lamps 31 and 32 for slit-exposing the platen 21 in the main scanning direction (Y-direction in FIG. 3), two mirrors 33 and 34 for refracting reflected light, a lens unit 35 for focusing light rays, and a linear image sensor 37 attached to an image sensor board 36 for converting an optical image on the focal plane into an electrical signal. At the starting point of time of the copying operation, the reading unit 29 is at the position shown in the drawing so that the picture image of the indicating strips 23B and 24B is focused such that it is highlighted as white in the black background.

Figure 5:
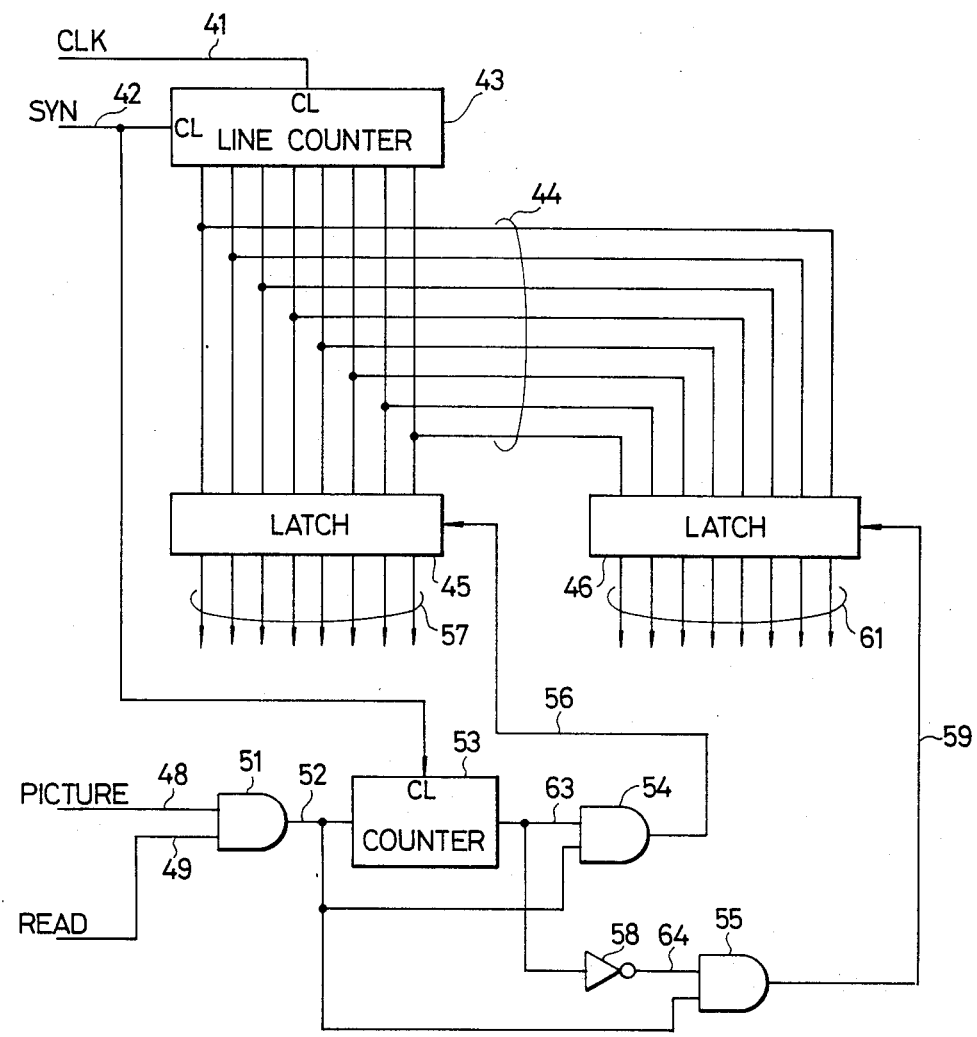
FIG. 5 is a block diagram of an electric circuit of the picture image position setting apparatus.

FIG. 5 illustrates an electric circuit section of the picture image position setting apparatus. The circuit comprises a line counter 43 for counting a clock signal 41, the count being cleared by a synchronizing signal 42. Eight bits of binary information 44 produced from the line counter 43 are supplied to a first and a second latch circuit 45 and 46. The picture signal produced by the linear image sensor 37 (FIG. 4) is converted into a two-valued signal 48 which is then supplied to a two-input AND circuit 51 together with a reading signal 49 which is at a high level in the positioning operation. A logic output 52 which has been ANDed in the AND circuit 51 is applied to a binary counter 53 as well as to one of two input terminals of each of two two-input AND circuits 54 and 55. The binary counter 53 is cleared by the synchronizing signal 42. The output 63 of the binary counter 53 at a high level when the logic output signal 52 becomes high so that the first latch circuit 45 is latched by a first latch pulse 56 produced from the AND circuit 54. At this time, positional data 57 with respect to the starting point in the Y-direction is produced from the first latch circuit 45.

On the other hand, the AND circuit 55 performs the AND operation between the logic signal 52 and the signal obtained by inverting the output of the binary counter 53 in an inverter 58 to produce an output which is supplied as a second latch pulse to the second latch circuit 46 to latch the circuit 46. At this time, the second latch circuit 46 produces positional data 61 with respect to the end point in the Y-direction.

Figure 6:
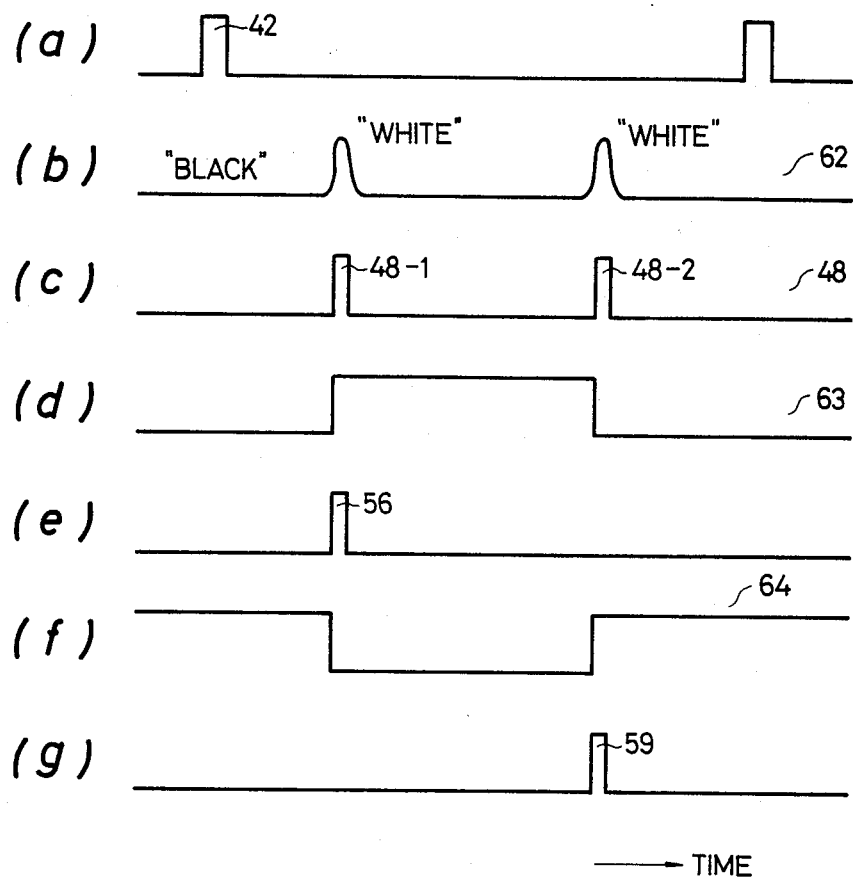
FIG. 6 shows waveforms appearing at various points of the circuit of FIG. 5.

A particular operation of the FIG. 5 circuit will now be described by referring to FIG. 6. The operator pushes a start button (not shown) for starting the reading operation at first, and the copying machine is put in its state for the positioning operation in the Y-direction for a predetermined period from that time. The pair of fluorescent lamps 31 and 32 are then started to illuminate the sheet. The synchronizing signal 42 is outputted for determining the timing of initiating the scanning for every line performed by the linear image sensor 37. When the outputs of the fluorescent lamps 31 and 32 have been stabilized, the reading signal 49 becomes high only during the reading operation of one line in synchronism with the synchronizing signal 42 (FIG. 6a). Upon the completion of one line reading operation in such a state, the linear image sensor 37 produces an analog picture image signal 62 as shown in FIG. 6(b) in which only the portions at the indicating strips 23B and 24B are illustrated as a white picture signal. The analog signal 62 is converted into a two-valued output 48 (FIG. 6c) which is applied to the AND circuit 51 and then applied as a logic output signal 52, and to the binary counter 53.

The binary counter 53 produces the binary counter output 63 (FIG. 6d) which rises at the rising of an output pulse 48-1 corresponding to the first indicating strip 23B and falls at the falling of an output pulse 48-2 corresponding to the next indicating strip 24B. The binary counter output 63 is ANDed with the logic output signal 52 by the AND circuit 54 which produces and applies the first latch pulse 56 (FIG. 6e) corresponding to the output pulse 48-1 to the first latch circuit 45. The first latch circuit 45 latches at that time the count of the clock signal 41 initiated after the generation of the synchronizing signal 42 and produces the count as positional data 57 with respect to the starting point in the Y-direction.

On the other hand, the output of the binary counter 53 is inverted by the inverter 58 which produces an inverted output 64 (FIG. 6f). The inverted output 64 is ANDed with the logic output signal 52 by the AND circuit 55 which produces and applies the second latch pulse 59 (FIG. 6g) corresponding to the output pulse 48-2 to the second latch circuit 46. The second latch circuit 46 latches at that time the count of the clock signal 41 and produces the positional data 61 with respect to the end point in the Y-direction.

Upon the completion of the positioning operation in the Y-direction in such a manner, the driving of a step motor (not shown) is started. Then the displacing of the reading unit 29 in the X-direction is initiated so that the reading of original document from a part designated with respect to this direction by another mechanism is performed.

As described above, according to the present invention, the positioning operation in the main scanning direction is performed by using an image sensor used for reading picture images and therefore a highly accurate picture image position setting apparatus can be produced by adding only a simple mechanism to a conventional reading apparatus.

Further, although a white cursor is used in the preferred embodiment as described above, a black cursor may be used with the entire under surface of the platen cover made white. Furthermore, although fluorescent lamps are used for directing light onto the cursor to detect the position thereof, a light emitting element such as a light emission diode may be provided at the cursor to detect the position thereof without using any fluorescent lamp.

We claim:

1. A picture image position setting apparatus comprising: a platen supporting a document;
   linear reading means for obtaining picture information by scanning an original document line by line;
   a position designating cursor attached to said platen for sliding movement in a main scanning direction to designate an end portion of a document scanning region on the platen;
   said cursor being adapted to be sensed by said linear reading means; and
   circuit means for converting picture image information with respect to the position designating cursor into positional information in the main scanning direction.

2. The apparatus of claim 1 wherein said platen comprises a groove in the main scanning direction and said cursor is mounted for sliding movement in said groove.

3. The apparatus of claim 2 further comprising a second cursor positioned for sliding movement in said groove, said cursors positionable to designate a front end position and a rear end position of an original document scanning region, and said cursors made of a material that color contrasts with a cover for said platen.

4. The apparatus of claim 1 wherein said linear reading means comprises a reciprocating reading unit having lens means for receiving light from an illuminated zone on said platen, and linear image sensor receiving light focused by said lens means into an electrical signal.

5. The apparatus of claim 4 further comprising means to illuminate a portion of said platen.

6. The apparatus of claim 1 further comprising a second cursor disposed for sliding movement, said cursors designating starting and end positions for scanning in the main scanning direction.

7. The apparatus of claim 6 wherein said circuit comprises a line counter providing a plurality of bits of position information in parallel to first and second latches respectively;
   logic means receiving the output of said linear reading means and a reference signal to produce a first output to said first latch for generating positional information indicative of the starting point in said main scanning direction and, said logic means producing a second output to said second latch for generating positional information indicative of the end point in said main scanning direction.

8. The apparatus of claim 7 wherein said logic means comprises a first AND gate receiving said output of said linear reading means and a reference signal and producing an output corresponding to a sensing of said first and second cursors, a counter producing a pulse output having a pulse width indicative of the interval between outputs of said first AND gate and means responsive to the start of said counter pulse output for producing an output to said first latch.

9. The apparatus of claim 8 further comprising means responsive to end of said counter pulse output for producing an output to said second latch.

* * * * *